I. O. BARBER.
Saw-Set.

No. 217,850. Patented July 29, 1879.

Attest.
M. M. Converse
B. A. Omsbee

Inventor.
Isaac O. Barber
By B. C. Converse, Atty.

UNITED STATES PATENT OFFICE.

ISAAC O. BARBER, OF SPRINGFIELD, OHIO, ASSIGNOR OF ONE-HALF HIS RIGHT TO GEORGE DRISCOLL, OF SAME PLACE.

IMPROVEMENT IN SAW-SETS.

Specification forming part of Letters Patent No. 217,850, dated July 29, 1879; application filed February 14, 1879.

*To all whom it may concern:*

Be it known that I, ISAAC O. BARBER, of the city of Springfield, in the county of Clarke and State of Ohio, have invented certain new and useful Improvements in Saw-Sets; and I hereby declare that the following is a full, complete, concise, and exact description of the same, reference being had to the drawings hereto annexed.

My invention relates to that class of saw-sets which are used for setting both circular and straight saws, and embraces in its construction the several parts necessary for both purposes.

Saw-sets have been constructed with an anvil and a bed-plate or arm, carrying a stud, on which the circular saw is centered to hold it in position for setting the teeth; but this arm is usually stationary, necessarily limiting the adjustment. To enlarge the scope of adjustment, as well as to simplify the means employed, I pivot the arm to the anvil so as to allow it to be moved, with its centering-stud and the saw thereon, horizontally in the arc of a circle.

Figure 1:
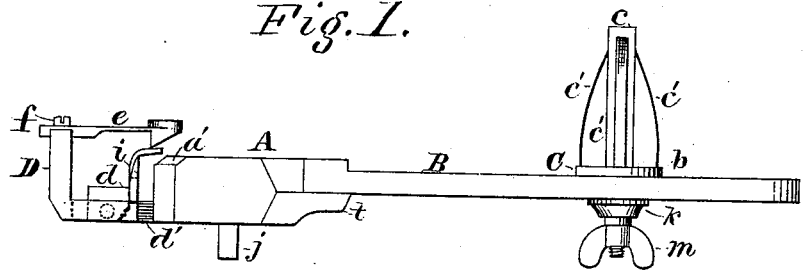
Figure 2:
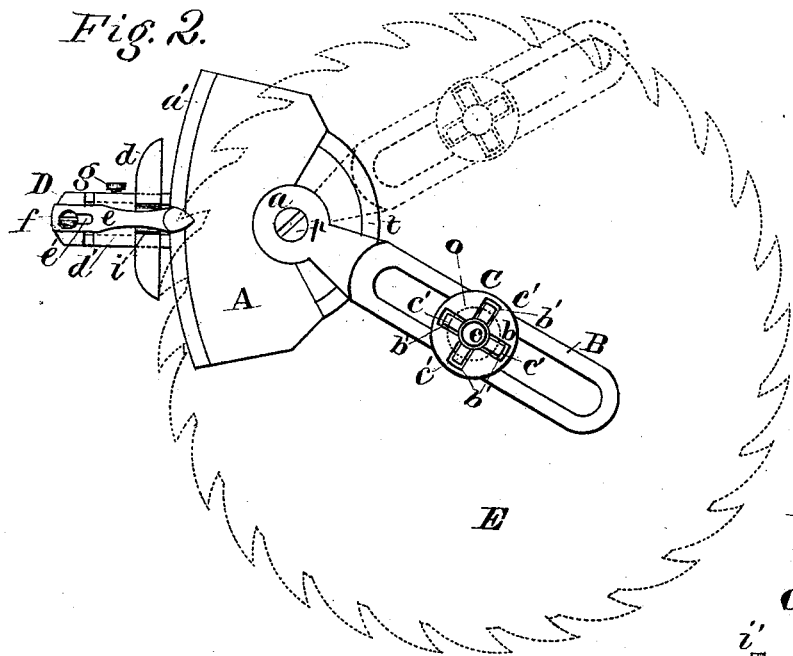

Figure 1 is a side elevation of my improved saw-set. Fig. 2 represents a plan view of the same, with a circular saw in dotted lines, shown ready for the operation of setting the teeth.

A is the anvil of the saw-set. It is a heavy segment-shaped block of chilled cast-iron or of steel, with a flat face on the top, and having its circular edge $a'$ chamfered or beveled off at the angle with its face to suit the inclination required for the points of the saw-teeth. Centrally, at the back edge of its face side, is milled out a circular recess for the reception of the head $a$ of the arm B, which is pivoted therein so as to be movable in the arc of a circle horizontally when the screw-bolt $p$ is loosened. The arm B rests on a semicircular traverse, $t$, extending from the back corners of the anvil, cast on it, and can be moved through one-third of a circle, as seen by the dotted lines in this figure. The arm has a long vertical slot in it, extending from the traverse $t$ to near its extreme end, in which it carries an adjustable stud, C, which is movable along the slot, adapting its position to large or small circular saws. This stud will be hereinafter more fully described.

The saw E, in dotted lines, is shown centered, with its eye slipped on the adjustable stud C, and the arm B in Fig. 2 thrown to the left, so as to bring the teeth square across the bevel $a'$ for the first part of the operation.

The alternate teeth having been set by the spring-hammer $e$, the pivot-screw is loosened slightly, the arm B thrown to the left to the position also shown in dotted lines, the saw E turned over and placed with its eye over the stud C, as before, (which latter remains secured in place,) and the second part of the setting operation continued as before.

The stud C is constructed with a long upright stem, $c$, having a broad circular base, $b$, which extends entirely across the face of the arm, and is provided with four oblong slots, $b'$ $b'$, cut through it vertically, and extending from the bottom of the stem $c$ to near its periphery. These slots are for allowing the compression and expansion of the springs $c'$, the free ends of which extend down through them. These springs have their upper ends fastened in the corresponding sides of the stem $c$ at the top, and diverge outwardly as they extend downward, pressing against the outer ends of slots $b'$ as they extend through them. Being bent somewhat by their outward expansion at their lower ends they form a support of conical contour, and their elasticity allows their ready adaptation to large or small saw-eyes. The lower stem of the stud which extends through the slot of the arm is threaded, and the stud is secured in its position by the collar $k$ and thumb-nut $m$.

Figure 3:
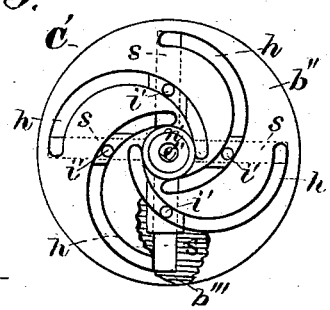
Figure 4:
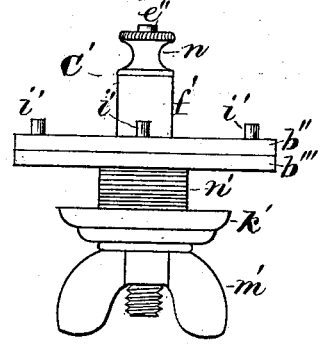

A modification of this stud is shown in Figs. 3 and 4, the lower portion of which is similar to C, while the upper portion has its base-plate $b''$ and stem $f'$ pivoted upon the rod $e''$, which extends upward from its fixed base $b'''$. This is slotted with four radial slots, S, (see dotted lines Fig. 3,) similar to the slots $b'$ in Figs. 1 and 2. Sliding blocks fitted in these slots, having upright studs or pins $i'$, which project through the semicircular slots $h$ of plate $b''$, play back and forth from the center outward and inward, as the loose plate $b$ is partially rotated in either direction, the studs operating similarly to the jaws in a scroll-chuck. The saw is placed with its eye over the pins $i'$, which are thrown outward by operating plate $b''$ till they press firmly against its inner periphery, when they are secured in position by the thumb-nut $m'$ and collar $k'$.

A milled head is screwed upon the upper end of rod $e''$ to hold the two parts of the stud $C'$ together.

The setting attachment D consists of a fixed arm projecting from the middle of the front edge of the anvil A, at the bottom part. It is cast in one piece with it. It turns up at right angles to form a pillar for the spring-hammer $e$, the stem of which is provided with a slot, $e'$, to make it adjustable, and secured on the top end by a screw, $f$, a groove being cut for its reception. The hammer extends over the bevel $a'$, so as to come over the point of the tooth to be set, and it is struck with the hammer as the saw is rotated on the stud.

If preferred, the spring-hammer can be removed, and the teeth can be set with a common hammer.

The horizontal part of arm D has a vertical oblong slot, $d'$, in it, in which is loosely fitted a sliding gage, $d$, (see Fig. 1,) in which a section is shown broken out from the arm. This gage is made at the upper part something in the form of an ordinary tool-rest on a wood-lathe, being extended laterally each way from the arm, and turned at right angles toward the bevel $a'$, so as to form an abutting edge for the teeth of a straight saw when being set.

A notch, $i$, is cut out to give room for the operation of the hammer $e$ from the middle of the top bar of the gage. The gage is made adjustable by a set-screw, $g$. (Shown on one side of the arm.)

In setting the teeth of a straight saw the gage $d$ is pushed toward the anvil till its head extends over the edge of bevel $a'$ the required distance to suit the depth of the set to be given to them. The head of the gage extends exactly at right angles across the central line of the anvil, so that as the teeth of the saw are slipped along the edge of the gage they will all be set exactly alike.

In using the tool for circular saws the gage $d$ can be pushed back to the opposite end of its slot $d'$, out of the way.

I am aware that a spring-hammer in a saw-set is not new, and I do not claim it.

I claim as my improvement—

1. In a saw-set, the combination of an anvil, A, having a semicircular traverse and an arm, B, pivoted thereto, as described, and an adjustable centering-stud, C, mounted upon said arm, as and for the purpose hereinbefore set forth.

2. In a saw-set, the combination of an anvil, A, having a semicircular traverse, an arm, B, pivoted to said anvil, as described, a setting attachment, D, having an adjustable spring set-hammer, $e$, and an adjustable gage, $d$, as and for the purpose hereinbefore set forth.

3. The centering-stud C, constructed with an upright stem, $c$, the slightly-curved vertical springs $c'\ c'$, having their upper ends fastened to the top of said stem and extending downward and outward through the radial slots $b'$ in the base $b$, near their outer ends, so as to form a support of conical shape, as and for the purpose shown and described.

ISAAC O. BARBER.

Attest:
B. C. CONVERSE,
JOHN H. DRISCOL.